United States Patent
Jard et al.

(10) Patent No.: US 8,274,952 B2
(45) Date of Patent: Sep. 25, 2012

(54) TRANSMISSION POWER MANAGEMENT

(75) Inventors: Alexandre Jard, Surennes (FR); Jean-Marc Corbel, Paris (FR); Michael Morette, Clamart (FR)

(73) Assignee: Alcatel Lucent, Paris (FR)

( * ) Notice: Subject to any disclaimer, the term of this patent is extended or adjusted under 35 U.S.C. 154(b) by 1176 days.

(21) Appl. No.: 11/545,312

(22) Filed: Oct. 10, 2006

(65) Prior Publication Data

US 2008/0084848 A1 Apr. 10, 2008

(51) Int. Cl.
*H04B 7/216* (2006.01)
*H04B 7/00* (2006.01)

(52) U.S. Cl. ........ 370/335; 370/329; 370/336; 370/337; 370/339; 370/342; 455/9; 455/13.4; 455/115.3; 455/522

(58) Field of Classification Search .................. 370/329, 370/335, 336, 337, 342, 339; 455/9, 13.4, 455/115.1, 115.3, 126, 127.1, 127.5, 424, 455/522
See application file for complete search history.

(56) References Cited

U.S. PATENT DOCUMENTS

| | | | |
|---|---|---|---|
| 6,134,444 A * | 10/2000 | Kotzin ........................... | 455/453 |
| 6,289,217 B1 * | 9/2001 | Hamalainen et al. ......... | 455/425 |
| 6,584,325 B1 * | 6/2003 | Shakhgildian ................ | 455/525 |
| 6,628,956 B2 * | 9/2003 | Bark et al. ..................... | 455/522 |
| 6,704,579 B2 * | 3/2004 | Woodhead et al. ........... | 455/522 |
| 6,856,812 B1 * | 2/2005 | Budka et al. .................. | 455/522 |
| 7,082,107 B1 * | 7/2006 | Arvelo .......................... | 370/311 |
| 7,106,694 B1 * | 9/2006 | Salonen et al. ............... | 370/230 |
| 7,164,660 B2 * | 1/2007 | Baker et al. ................... | 370/318 |
| 7,206,332 B2 * | 4/2007 | Kwan et al. ................... | 375/140 |
| 7,302,276 B2 * | 11/2007 | Bernhardsson et al. ...... | 455/522 |
| 7,333,450 B2 * | 2/2008 | Holma et al. ................. | 370/328 |
| 7,408,895 B2 * | 8/2008 | Zhang et al. .................. | 370/318 |
| 7,656,972 B2 * | 2/2010 | Willenegger ................. | 375/341 |
| 2001/0038619 A1 * | 11/2001 | Baker et al. ................... | 370/335 |
| 2002/0075939 A1 * | 6/2002 | Zeira et al. .................... | 375/130 |
| 2002/0077138 A1 * | 6/2002 | Bark et al. ..................... | 455/522 |
| 2002/0115464 A1 * | 8/2002 | Hwang et al. ................. | 455/522 |
| 2002/0181436 A1 * | 12/2002 | Mueckenheim et al. ..... | 370/349 |
| 2004/0100920 A1 * | 5/2004 | Ball et al. ...................... | 370/318 |
| 2004/0152481 A1 * | 8/2004 | Georgeaux et al. ........... | 455/522 |
| 2005/0036449 A1 * | 2/2005 | Ranta-Aho et al. ........... | 370/235 |
| 2005/0143118 A1 * | 6/2005 | Bernhardsson et al. ...... | 455/522 |

(Continued)

OTHER PUBLICATIONS

Technical Specification, "3GPP TS 25.309 V6 6.0 (Mar. 2006); 3rd Generation Partnership Project; Technical Specification Group Radion Access Network; FDD Enhanced Uplink; Overall Description; Stage 2, Release 6"; Mar. 2006.*

(Continued)

*Primary Examiner* — Michael Thier
*Assistant Examiner* — Benjamin H Elliott, IV
(74) *Attorney, Agent, or Firm* — Fay Sharpe LLP

(57) ABSTRACT

The present invention relates to a method of adjusting transmission power on a downlink radio channel in a communication system comprising a user equipment and a base station. In the method uplink power headroom is determined by dividing a maximum transmission power of the user equipment by a transmission power of a control channel of the user equipment and the determined uplink power headroom value is sent to the base station. Then uplink path loss estimate is determined between the user equipment and the base station based on the uplink power headroom. Then an estimate for the downlink path loss is derived and finally the transmission power of the downlink radio channel is adjusted taking into account the downlink path loss estimate.

6 Claims, 8 Drawing Sheets

U.S. PATENT DOCUMENTS

| | | | |
|---|---|---|---|
| 2006/0035660 A1* | 2/2006 | Anderson | 455/522 |
| 2006/0068830 A1* | 3/2006 | Klomsdorf et al. | 455/522 |
| 2006/0072503 A1* | 4/2006 | Kim et al. | 370/329 |
| 2006/0209692 A1* | 9/2006 | Usuda et al. | 370/232 |
| 2006/0252450 A1* | 11/2006 | Wigard et al. | 455/522 |
| 2006/0256757 A1* | 11/2006 | Kuusela et al. | 370/335 |
| 2006/0280145 A1* | 12/2006 | Revel et al. | 370/331 |
| 2007/0002801 A1* | 1/2007 | Usuda et al. | 370/333 |
| 2007/0019668 A1* | 1/2007 | Lee et al. | 370/458 |
| 2007/0047501 A1* | 3/2007 | Usuda et al. | 370/335 |
| 2007/0111746 A1* | 5/2007 | Anderson | 455/522 |
| 2007/0115871 A1* | 5/2007 | Zhang et al. | 370/318 |
| 2007/0149233 A1* | 6/2007 | Wang et al. | 455/522 |
| 2008/0037413 A1* | 2/2008 | Gu et al. | 370/210 |
| 2008/0039129 A1* | 2/2008 | Li et al. | 455/522 |
| 2008/0070565 A1* | 3/2008 | Maeda | 455/424 |
| 2008/0084848 A1* | 4/2008 | Jard et al. | 370/332 |
| 2008/0102876 A1* | 5/2008 | Karlsson | 455/522 |
| 2008/0175185 A1* | 7/2008 | Ji et al. | 370/318 |
| 2008/0254819 A1* | 10/2008 | Niwano et al. | 455/522 |

OTHER PUBLICATIONS

TS 25.309, V6.6.0, "FDD Enhanced Uplink; Overall description; Stage 2 (Release 6)", published in Mar. 2006 by the 3GPP.*

* cited by examiner

TRANSMISSION POWER MANAGEMENT

FIELD OF THE INVENTION

The present invention relates to radio transmissions, and more precisely to the transmission power management in a base station of a wireless communication system.

BACKGROUND OF THE INVENTION

In the present description, the invention will be described more particularly in its non-limiting application to third generation radio communication networks of the universal mobile telecommunication system (UMTS) type. In this system, the invention finds application within the framework of the high speed uplink packet access (HSUPA) feature being specified by the $3^{rd}$ Generation Partnership Project (3GPP)—also named "FDD enhanced uplink" in 3GPP terminology, or "E-DCH" according to the transport channel's name. This feature is described particularly in the technical specification TS 25.309, V6.6.0, "FDD Enhanced Uplink; Overall description; Stage 2 (Release 6)", published in March 2006 by the 3GPP.

FIG. 1 shows the architecture of such a UMTS network. The switches 101 of the communication network belonging to a core network (CN), are linked on the one hand to one or more fixed network 103 and on the other hand, by means of a so-called lu interface, to command equipment 105 or radio network controllers (RNCs). Each RNC 105 is linked to one or more base stations (BSs) 107 (or Node-Bs according to 3GPP specifications) by means of a so-called lub interface. The BSs 107, distributed over the territory covered by the network, are capable of communicating by radio with the mobile terminals 109 called user equipments (UEs). Certain RNCs 105 may furthermore communicate with one another by means of a so-called lur interface. The RNCs 105 and the BSs 107 form an access network called UMTS terrestrial radio access network (UTRAN).

The UTRAN comprises elements of layers 1 and 2 of the ISO model with a view to providing the links required on the radio interface (called Uu), and a stage 201 (FIG. 2) for controlling the radio resources (radio resource control, RRC) belonging to layer 3, as is described in the 3GPP TS 25.301 technical specification "Radio Interface Protocol Architecture", version 6.4.0 published in September 2005 by the 3GPP. In view of the higher layers, the UTRAN acts simply as a relay between the UE and the CN.

FIG. 2 shows the RRC stages 201a, 201b and the stages of the lower layers which belong to the UTRAN and to a UE. On each side, layer 2 is subdivided into a radio link control (RLC) 203a, 203b and a medium access control (MAC) stage 205a, 205b. Layer 1 comprises a coding and multiplexing stage 207a, 207b. A radio stage 209a, 209b caters for the transmission of the radio signals from trains of symbols provided by the stage 207a, 207b, and the reception of the signals in the other direction.

There are various ways of adapting the architecture of protocols according to FIG. 2 to the hardware architecture of the UTRAN according to FIG. 1 and in general various organisations can be adopted depending on the types of channels (see section 11.2 of the 3G TS 25.401 technical specification "UTRAN Overall Description", version 7.0.0 published in March 2006 by the 3GPP). The RRC, RLC and MAC stages are typically located in the RNC 105. When several RNCs 105 are involved, the MAC sublayer can be apportioned among these RNCs 105, with appropriate protocols for the exchanges on the lur interface, for example asynchronous transfer mode (ATM) and ATM adaptation layer No. 2 (AAL2). These same protocols may also be employed on the lub interface for the exchanges between the MAC sublayer and layer 1.

UMTS proposes a high speed uplink packet access (HSUPA) feature of which an overall description can be found in the 3GPP 25.309 technical specification "FDD enhanced uplink; Overall description; Stage 2", version 6.6.0 published in March 2006 by the 3GPP. HSUPA allows high rate uplink transmission, i.e. from a UE to the access network. This service is based on the so-called enhanced dedicated channel (E-DCH) and it has the following characteristics: a new type of transport channel which supports hybrid processes for requesting data retransmission of the hybrid automatic repeat request (HARQ) type, adaptive modulation and coding and BS scheduling of the uplink data transmissions.

At the MAC level, a new MAC entity (MAC-es/MAC-e) has been added in the UE below MAC-d as seen in FIG. 3. MAC-es/MAC-e handles scheduling and MAC-e multiplexing, HARQ retransmissions and E-DCH traffic format combination (TFC) selection. The MAC-e, has been introduced in the UTRAN architecture, and more specifically at the BS level to handle HARQ retransmissions, scheduling and MAC-e demultiplexing. In the serving RNC (SRNC) MAC-es is added to provide in-sequence delivery (reordering) and to handle combining of data from different BSs in case of soft handover. This architecture is illustrated in FIG. 3, and described in the technical specification TS 25.309 "FDD eenhanced uplink; Overall description; Stage 2", version 6.6.0, published in March 2006 by the 3GPP.

In the downlink, a resource indication (scheduling grant) is required to indicate to the UE 109 the maximum size of a transport bloc, mapped onto a modulation and coding scheme (MCS) that the UE 109 can use. When issuing scheduling grants, the BS 107 may use quality of service (QoS) related information provided by the SNRC and from the UE 109 scheduling requests. There are two types of grants. Absolute grants provide an absolute limitation of the maximum amount of uplink resources the UE may use. The absolute grant is transmitted in the downlink cell on a physical channel called enhanced absolute grant channel (E-AGCH). FIG. 4 illustrates this situation. Relative grants on the other hand increase or decrease the resource limitation compared to the previously used value.

As far as the power control of a radio channel in a communication system is concerned, a simple solution would be to use constant power for E-AGCH transmissions. However, if the transmission power is set to a too low value, the information transmitted on the channel may not be correctly received by the receiver. For instance, in the context of E-AGCH, it is important that the UE 109 receives information sent by the BS 107 on E-AGCH correctly so that the UE 109 knows when to transmit on E-DCH and which MCS to apply. On the other hand, the constant power, as is used for instance on E-AGCH, wastes network resources and creates interference, if it is set to a too high value.

SUMMARY OF THE INVENTION

One object of the invention is to limit the above-identified deficiencies.

According to a first aspect of the invention, there is proposed a method of adjusting transmission power on a downlink radio channel from a base station to a user equipment, the method comprises the following steps carried out at said base station:

receiving an uplink power headroom indication from the user equipment;

obtaining an estimate of an uplink path loss between the user equipment and the base station, said uplink path loss estimate taking account of said uplink power headroom;

deriving an estimate of a downlink path loss between the user equipment and the base station, from said uplink path loss estimate; and adjusting the transmission power on said downlink radio channel by taking account of said downlink path loss estimate.

The invention in accordance with an embodiment of the invention has the advantage that the transmission power can be adjusted so that the cell capacity and thus the network resources are increased. This also increases the performance of the network and a better quality of service (QoS) can be provided to the users of the network.

According to a second aspect of the invention, there is provided a computer program product comprising instructions for implementing any of the method steps in accordance with the first aspect of the invention when loaded and run on computer means of the base station.

According to a third aspect of the invention, there is provided a base station capable of adjusting transmission power on a downlink radio channel from a base station to a user equipment, said base station comprises:

means for receiving an uplink power headroom indication from the user equipment;

means for obtaining an estimate of an uplink path loss between the user equipment and the base station, said uplink path loss estimate taking account of said uplink power headroom;

means for deriving an estimate of a downlink path loss between the user equipment and the base station, from said uplink path loss estimate; and means for adjusting the transmission power on said downlink radio channel by taking account of said downlink path loss estimate.

BRIEF DESCRIPTION OF THE DRAWINGS

Other features and advantages of the invention will become apparent from the following non-limiting description with reference to the appended drawings, in which.

DETAILED DESCRIPTION OF EMBODIMENTS OF THE INVENTION

Some embodiments of the invention will now be described in more detail in the framework of the UMTS HSUPA. In this case, the considered radio channel between the UE 109 and the BS 107 is thus a high speed uplink channel, like an E-DCH. The invention could also be applied to other channels or units assuming that an uplink power headroom (UPH) or equivalent value is signalled from the UE 109 to the BS 107. It is to be noted that the invention can equally be applied to other types of communication systems as well.

Figure 1:
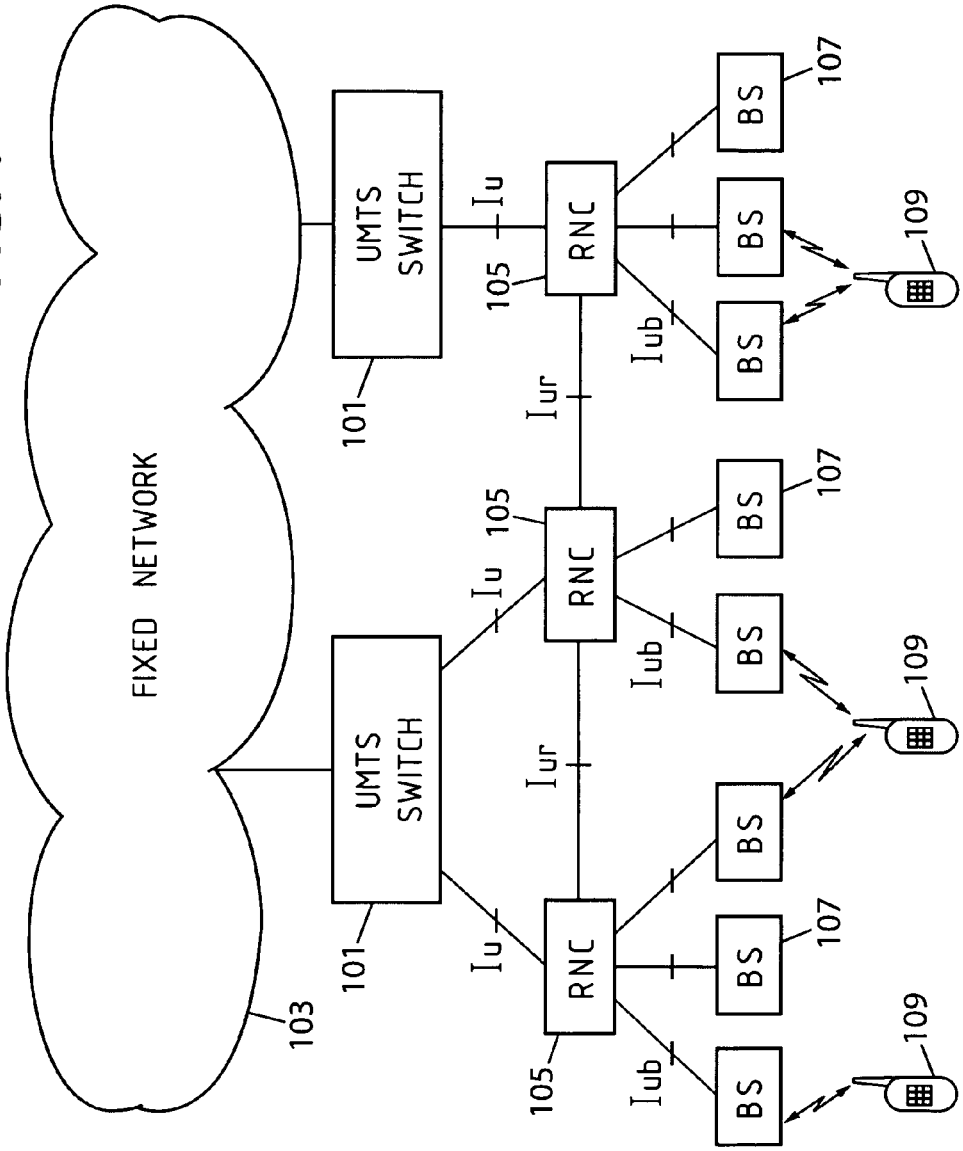
FIG. 1 is a diagram of a UMTS network to which some embodiments of the invention may be applied.
Figure 2:
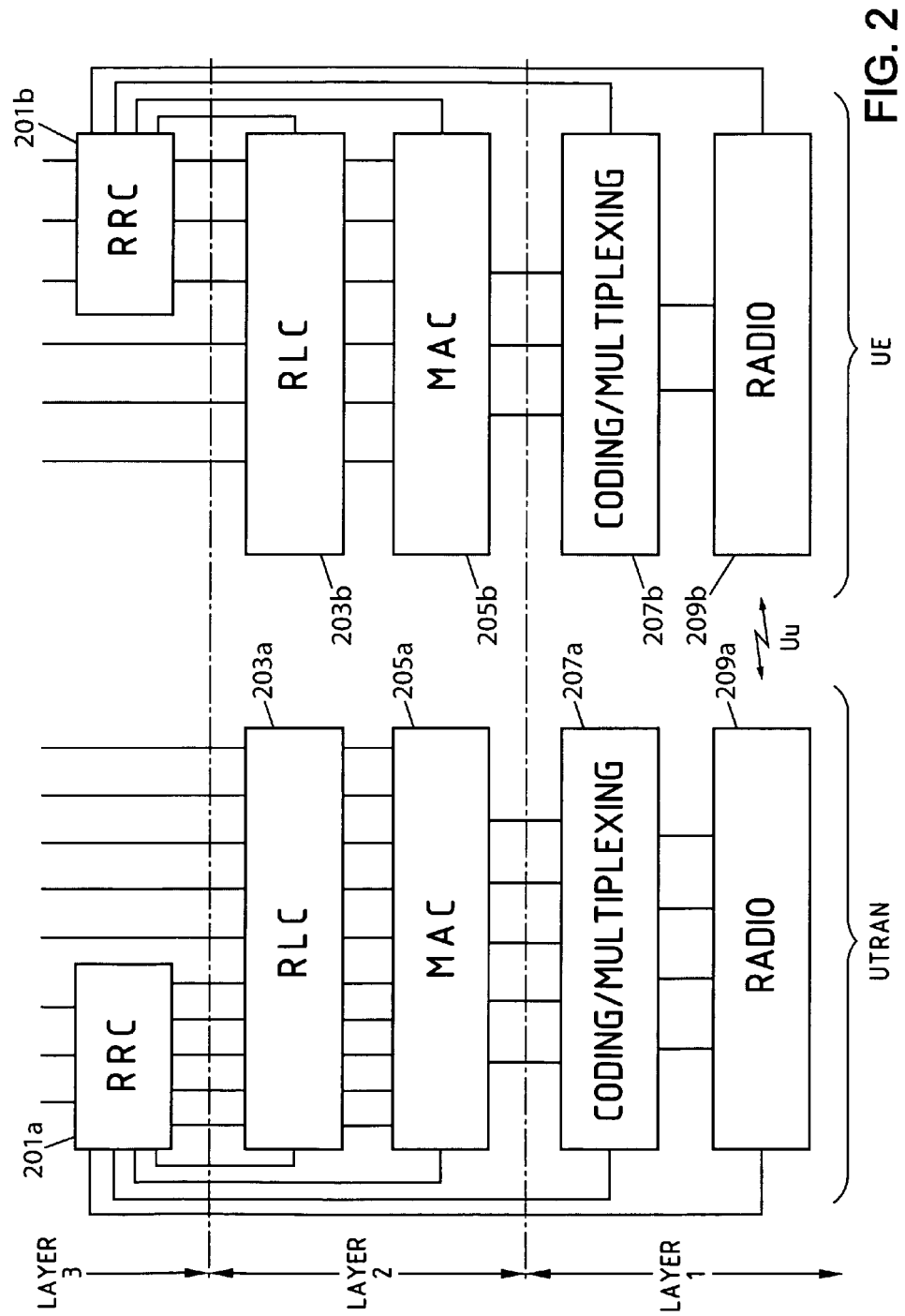
FIG. 2 is a chart showing the organisation of layers of communication protocols employed on the radio interface of the UMTS network.
Figure 3:
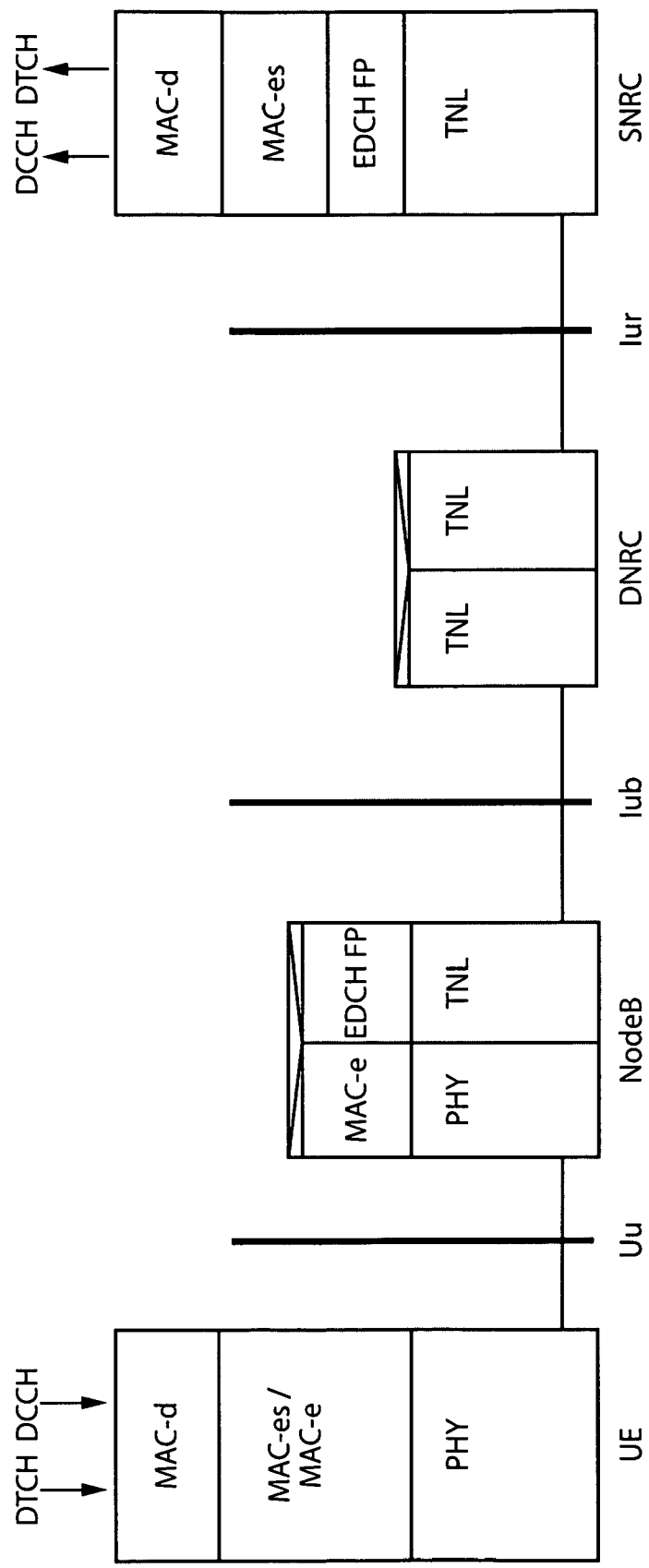
FIG. 3 illustrates the HSUPA protocol architecture.
Figure 4:
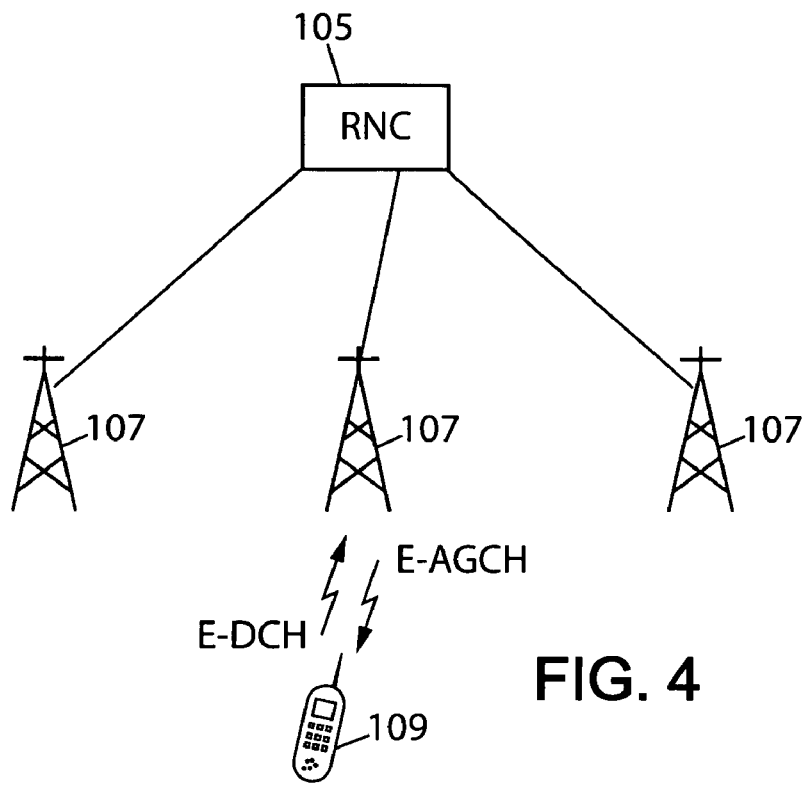
FIG. 4 illustrates how the communication system operates by using the E-DCH and E-AGCH in accordance with embodiments of the invention.

In FIG. 1, the network elements are arranged to implement corresponding protocols shown in FIG. 3. Furthermore, the BSs 107 are arranged to transmit on E-AGCH.

Figure 5:
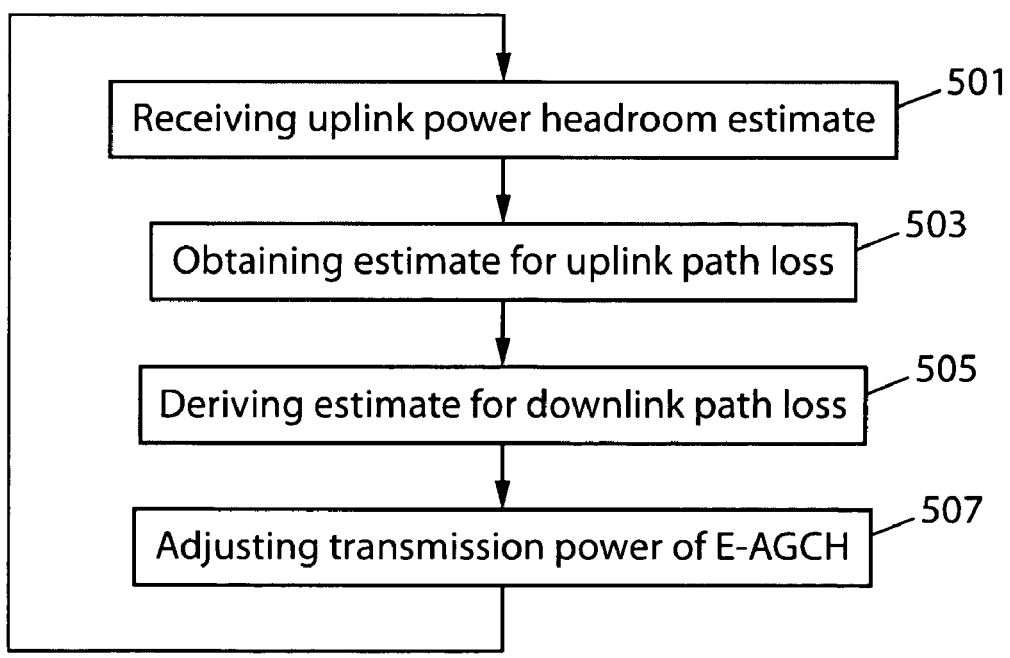
FIG. 5 is a flow chart illustrating the power adjustment method in accordance with an embodiment of the invention.

Next a method for determining transmission power on the E-AGCH is described with reference to FIG. 5 in accordance with an embodiment of the invention. In the context of E-DCH a metric called uplink power headroom (UPH) is determined in the following way:

$$UPH = \frac{P_{tx,max,UE}}{P_{tx,DPCCH,UE}}, \qquad (1)$$

where $P_{tx,max,UE}$ is the maximum transmission power of the UE 109. The UPH value is signalled (step 501) as scheduling information (SI) from the UE 109 to the BS 107 and $P_{tx,DPCCH,UE}$ is the maximum transmission power of the UE 109 on an uplink dedicated physical control channel (DPCCH). The maximum UE 109 transmission power is signalled by higher layer to layer 1. Thus, the UE 109 can inform the BS 107 about the $P_{tx,max,UE}$ and UPH values and then the BS 107 can calculate the $P_{tx,DPCCH,UE}$ value itself.

The embodiments of the present invention use the UPH value to adjust transmission power of the E-AGCH. This is next explained in more detail. From the radio signal propagation laws it follows:

$$P_{tx,DPCCH,UE} = PL_{UL} \cdot P_{rx,DPCCH,UE} \Leftrightarrow PL_{UL} = \frac{P_{tx,DPCCH,UE}}{P_{rx,DPCCH,UE}}, \qquad (2)$$

where $PL_{UL}$ is uplink path loss between the BS 107 and UE 109 and $$P_{rx,DPCCH,UE} = RTWP_{UL} \cdot SIR_{UL} \cdot PG, \qquad (3)$$

where PG is the processing gain associated to the spreading factor of DPCCH known by the BS 107, $SIR_{UL}$ is the uplink signal-to-noise ratio measured by the BS 107 and $RTWP_{UL}$ is total received wideband power at the BS 107. Thus, the uplink path loss estimate obtained above (step 503) takes account of the uplink power headroom value calculated in step 501.

Due to propagation differences between the uplink and downlink, $$PL_{DL} = \Delta \cdot PL_{UL}, \qquad (4)$$

where Δ is a factor taking into account the propagation difference, due to different frequencies used, between the uplink and downlink. Downlink path loss can now be written:

$$PL_{DL} = \frac{\Delta \cdot P_{tx,max,UE}}{RTWP_{UL} \cdot SIR_{UL} \cdot PG \cdot UPH} = \frac{\Delta \cdot P_{tx,max,UE}}{PG \cdot RTWP_{UL}} \cdot \frac{1}{SIR_{UL} \cdot UPH} \quad (5)$$

The downlink path loss is then calculated in step 505 and a corresponding Ior/Ioc value can be obtained from a chart depicting the relationship between the PLDL and the Ior/Ioc for a specific cell type. Ior is the transmit power spectral density at the BS 107 and Ioc is the power spectral density as measured at the UE 109. From the obtained Ior/Ioc value, Ec/Ior value corresponding to the power dedicated to the current channel can be deduced that has to be applied to reach a target QoS. Here Ec is energy accumulated over one chip period after despreading at the BS 107. Then in step 507, the transmission power of the E-AGCH can be adjusted taking into account the downlink path loss value obtained in step 505.

Figure 6:
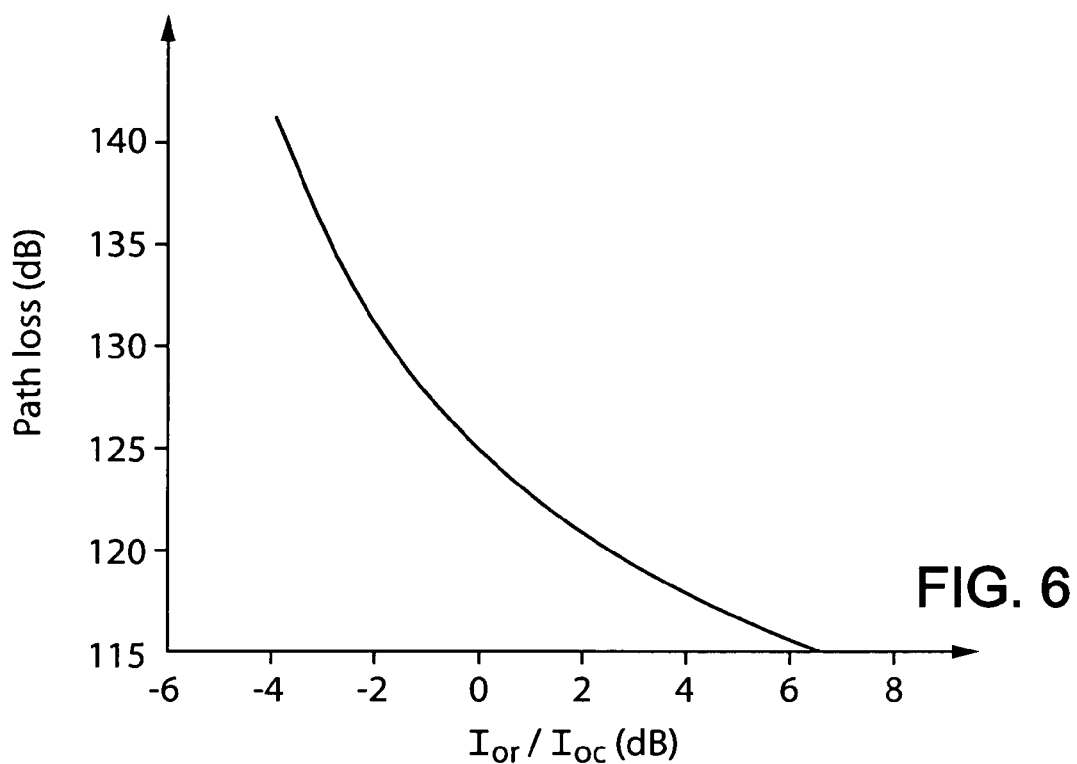
FIG. 6 shows a graphical representation of a relationship between downlink path loss and BS transmit power spectral density to UE power spectral density ratio ($I_o/I_{oc}$)

FIG. 6 depicts an exemplary relationship between the downlink path loss and the $I_{or}/I_{oc}$ value in a cell located in an urban area. In FIG. 6, the $I_{or}/I_{oc}$ values are measured in dBs and then for a certain path loss value, the corresponding $I_{or}/I_{oc}$ value is exceeded with a probability of 95%.

Figure 7:
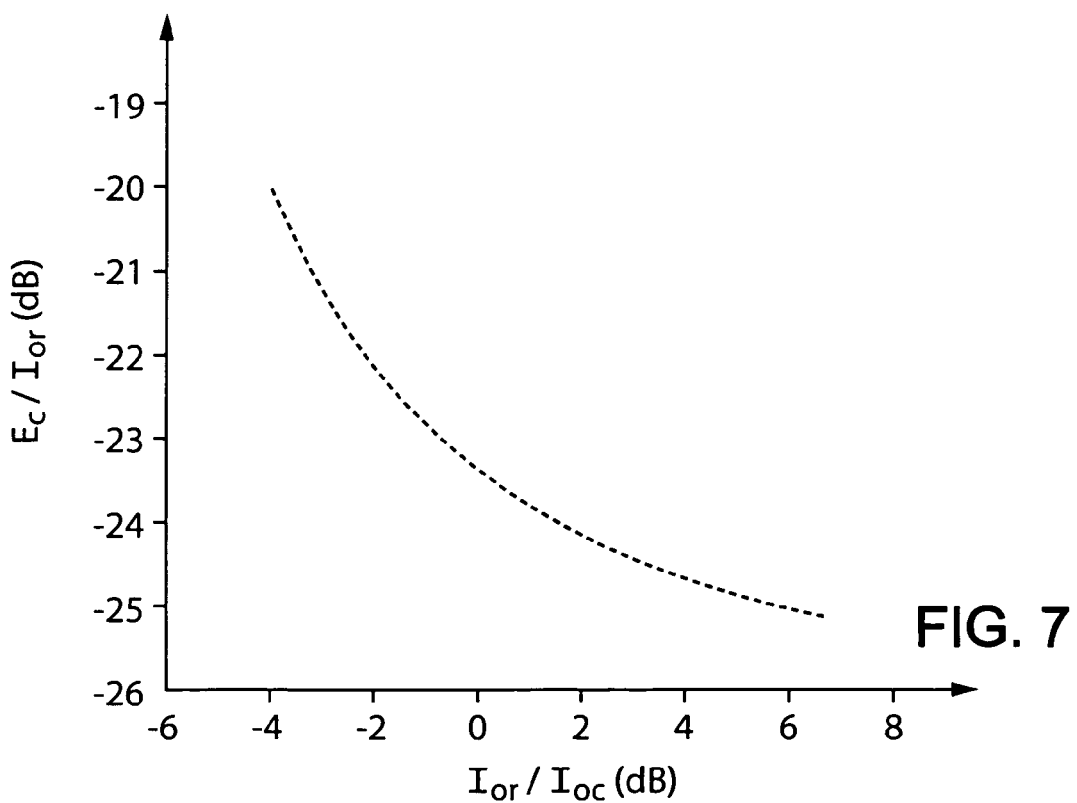
FIG. 7 shows a graphical representation of a relationship between energy accumulated over one pseudo random chip period after despreading at the BS to BS transmit power spectral density ratio ($E_c/I_{or}$) and $I_o/I_{oc}$.

FIG. 7 shows an exemplary relationship between the $E_c/I_{or}$ and the $I_{or}/I_{oc}$. Different curves are obtained for different QoS values. In this example, for instance the received block error rate (BLER) is set to 1%. Such tables can be saved in the BS 107.

Figure 8:
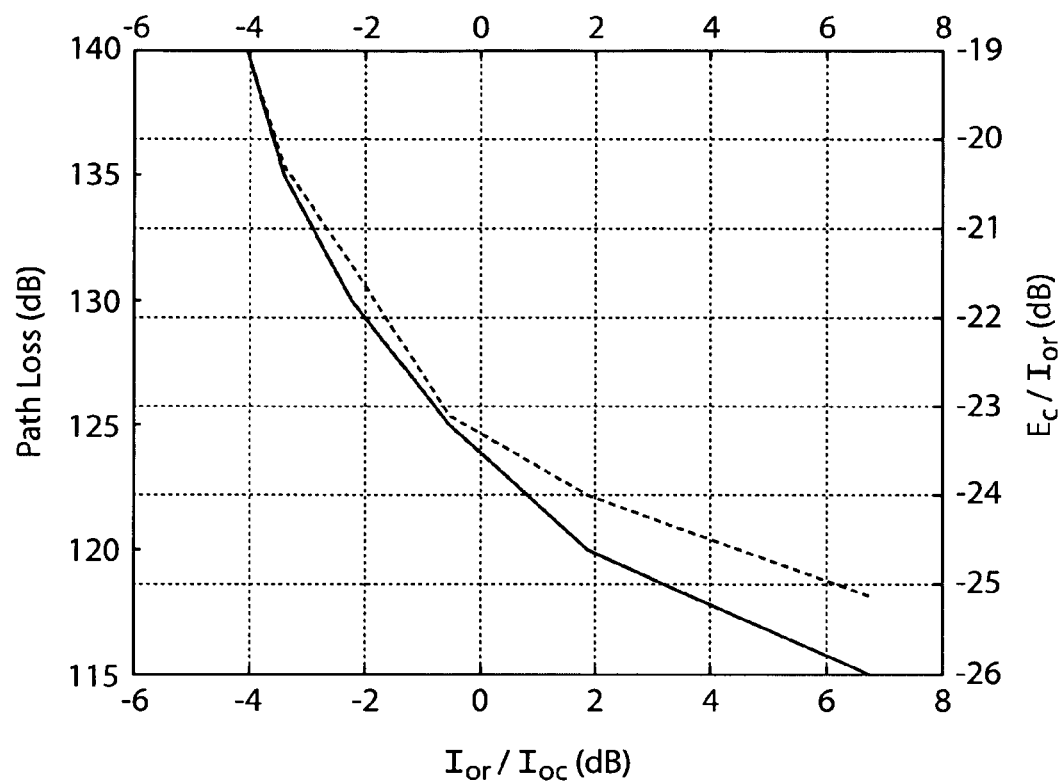
FIG. 8 shows the curves of FIGS. 6 and 7 drawn in the same figure.

Now the curves of FIGS. 6 and 7 can be drawn in a same figure to better illustrate the relationship between the downlink path loss and the $E_c/I_{or}$. This is illustrated in FIG. 8. As the downlink path loss value is now known as was explained above, the corresponding $E_c/I_{or}$ value can be obtained from FIG. 8. The $E_c/I_{or}$ indicates the percentage of a transmission power of a certain channel of the total transmission power of the BS 107. Thus, depending on the calculated downlink path loss value, the transmission power of the E-AGCH can be adjusted based on parameters comprising the $E_c/I_{or}$ value. In case of grouped scheduling operation (i.e. one E-AGCH is used for several UEs 109), the transmission power should be set to the maximum of all UEs 109 individual transmission powers.

The above power adjustment method can be further used as an open loop power control method in communication systems. The $E_c/I_{or}$ value is computed every time the BS 107 receives the UPH from the UE 109. However, to make the power adjustment loop operate faster, the method explained above can be modified. The faster operation of the E-AGCH power adjustment is based on the detected errors on the E-AGCH. This is next explained in more detail.

Figure 9:
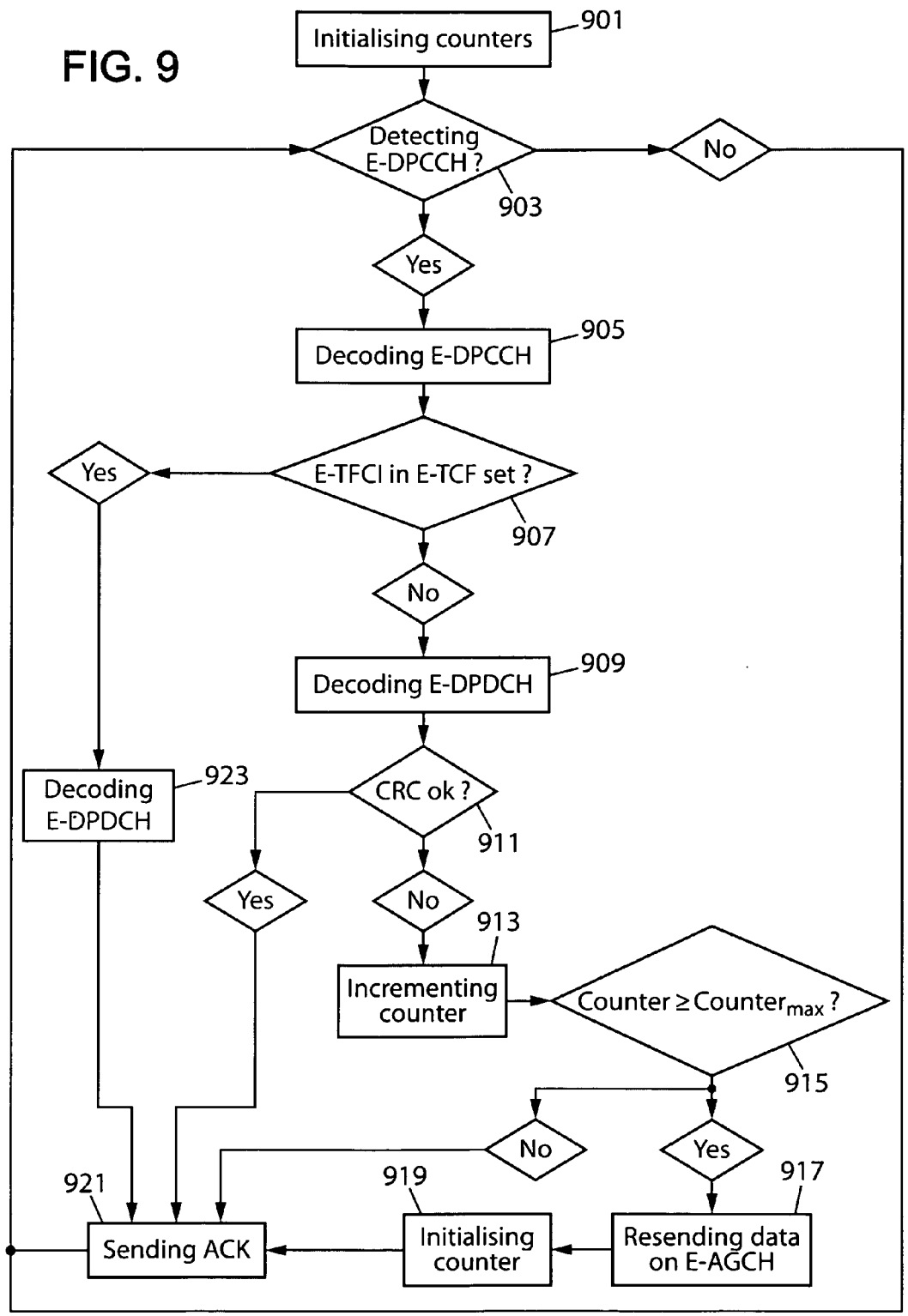
FIG. 9 is a flow chart depicting a method of detecting errors on E-AGCH in accordance with an embodiment of the invention.

FIG. 9 depicts a flow chart describing the method of detecting errors on the E-AGCH. In step 901 counters of the BS 107 are initialised. In this case, there are two counters: a transmission time interval (TTI) counter and an error counter. Entries in the counters are first set to zero. The entries in the TTI counter are set to zero in order to detect any TTIs from the UE 109.

If in step 903 it is detected that information is received on enhanced dedicated physical control channel (E-DPCCH), then in step 905 the BS 107 decodes information transmitted by the UE 109 on E-DPCCH. The purpose of decoding the E-DPCCH is here to detect (step 907) whether the UE 109 is using an enhanced traffic format combination identifier (E-TFCI) that does not belong to the allowed enhanced traffic format combination (E-TFC) set. The allowed E-TFC set is transmitted from the BS 107 to the UE 109 on the E-AGCH to inform the UE 109 about the MCS the UE 109 is allowed to use. This is under the control of the MAC-e scheduler located in the BS 107.

If in step 907 it is detected that the E-TFCI received from the UE 109 does not belong to the E-TFC set defined by the BS 107, in other words if in this case the used MCS is higher than what was indicated by the BS 107, then it may be assumed that the UE 109 did not receive information sent on E-AGCH correctly.

If in step 907 it is determined that the UE 109 uses an MCS that does not belong to the allowed MCS set defined by the BS 107, then in step 909 the BS 107 decodes information transmitted on enhanced dedicated physical data channel (E-DPDCH) using the MCS within the allowed E-TFC set that maximises the likelihood of correctly decoding the information transmitted on E-DPCCH. Thus another E-TFCI is decoded than what was detected in step 907. The purpose of decoding data on E-DPDCH is to determine in step 911 if the data can still be correctly received even if an E-DPCCH decoder does not provide an MCS within the allowed E-TFC set. In step 911 a cyclic redundancy check (CRC) is computed to determine whether data is correctly received.

If in step 911 it is determined that the CRC of the received data indicates that there are errors in the received data, then in step 913 the error counter is incremented. Then in step 915 the value of the error counter is compared to a predefined maximum error counter value (Counter$_{max}$). The purpose of this comparison is to find out whether a certain threshold is exceeded or whether there is just one or few occasional errors that are likely to correspond to E-DPCCH errors on the BS 107 side rather than E-AGCH errors on the UE 109 side.

If in step 915 it is detected that the maximum number of errors is exceeded, then in step 917 the data that was previously transmitted on E-AGCH is transmitted again and possibly with increased transmission power. The data may be transmitted immediately on the E-AGCH without waiting the regular time interval to elapse. Then in step 919 the error counter is initialised, i.e. the entries of the counter are set to zero. In step 921 an acknowledgement is sent to the UE 109 informing whether the E-DPDCH decoding has been successful or not.

If however, in step 903 it is detected that no information is received on E-DPCCH, then it can be concluded that the UE 107 is not transmitting any data and nothing is sent back to UE. The error detection procedure then resumes in step 903 by detecting on E-DPCCH.

If in step 907 it is detected that the E-TFCI sent by the UE 109 does belong to the E-TFC defined by the BS 107, i.e. in this case the MCS the UE 109 is using does not exceed the limit set by the BS 107, then information is decoded in step 923 on E-DPDCH and an acknowledgement is sent in step 921 to the UE 109 informing whether the decoding of the information transmitted on the E-DPDCH has been successfully decoded or not.

On the other hand, if in step 911 it is determined that the CRC indicates that the received data does not contain an error even if it is assumed that the E-DPCCH decoding provided an E-TFC value that does not belong to the allowed set of E-TFC values, then finally, an acknowledgment is sent in step 921 to the UE 109 informing whether the decoding of the information transmitted on the E-DPDCH has been successful or not.

If however, the CRC indicates that in the data there are errors but the error counter does not exceed the predefined maximum value for the errors, the error counter is not initialised and the acknowledgement is sent in step 921.

The error detection algorithm described above may be so configured that only errors in consecutive data blocks are taken into account. In this case the error counters are set to zero, if there are no errors in the subsequently received data blocks. Alternatively, there could be timer running and if within a certain time period not enough errors are detected, the error counters can be initialized.

Figure 10:
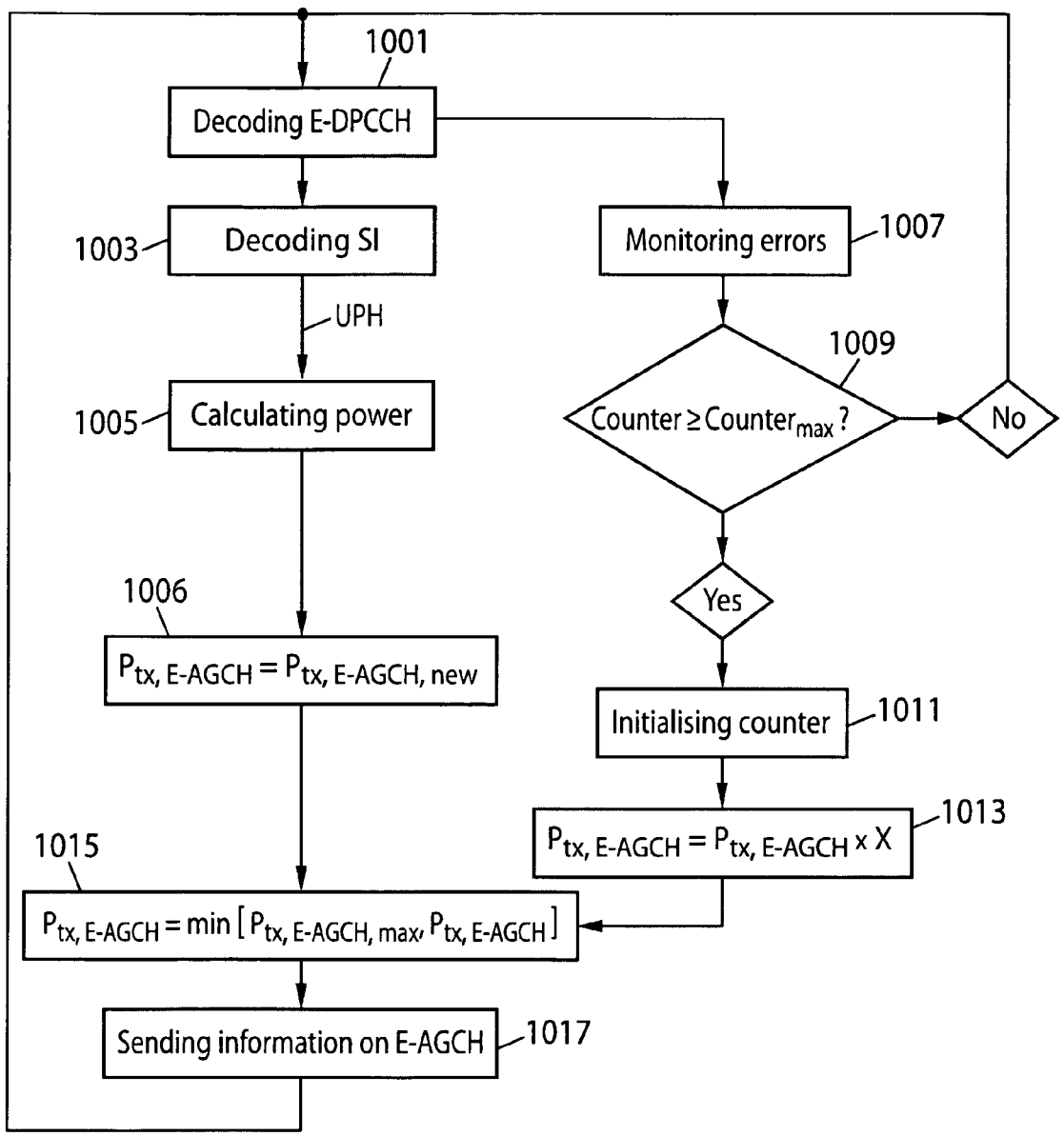
FIG. 10 is a flow chart depicting the power control method in accordance with an embodiment of the invention.

FIG. 10 shows a simplified flow chart of the power adjustment method in accordance with an embodiment of the invention. In FIG. 10, the power calculation based on the UPH is combined with the error detection method described in connection with FIG. 9.

In step 1001 the BS 107 decodes information received on E-DPCCH. Then in step 1003 the BS 107 decodes the scheduling information (SI) and detects that the UE 109 has sent a UPH value. Based on the obtained UPH value, the UE 109 then calculates in step 1005 a suitable transmission power. The UPH value is periodically sent by the UE 109 to the BS 107 in an Si block. The suitable transmission power is calculated as was explained above based on the UPH value. Then in step 1006 the $P_{tx,E\text{-}AGCH}$ obtained from the UPH is set to equal to $P_{tx,E\text{-}AGCH,new}$ obtained in step 1005.

In step 1007 errors on the E-AGCH are detected. The errors can be detected as was described in the context of FIG. 9 and more specifically in relation to blocks 907, 909, 911 and 913. And if in step 1009 it is detected that the error counter value exceeds the maximum value for the counter (Counter$_{max}$), then the error counter is initialised in step 1011 and the transmission power adjustment procedure continues in step 1013 by multiplying the current transmission power $P_{tx,E\text{-}AGCH}$ by a positive value X (X≧1). If however, the error counter value does not exceed the maximum value for the counter, then the transmission power adjustment procedure continues in step 1001 by decoding information transmitted on E-DPCCH.

When the suitable transmission power is obtained in steps 1006 and 1013, then in step 1015 the transmission power on the E-AGCH ($P_{tx,E\text{-}AGCH}$) is compared to a maximum allowed transmission power value $P_{tx,E\text{-}AGCH,max}$ on the E-AGCH. In case the calculated $P_{tx,E\text{-}AGCH}$ exceeds the maximum value $P_{tx,E\text{-}AGCH,max}$, the transmission power value is set to the $P_{tx,E\text{-}AGCH,max}$. In case the $P_{tx,E\text{-}AGCH}$ as calculated is within the limits, then there is no need to change the current transmission power value.

Then when the transmission power is calculated and when it is known to be within allowed limits, the BS 107 can now send information to the UE 109 on the E-AGCH (step 1017).

In the context of FIG. 10 a fast open loop power control was depicted. According to another embodiment, the invention can also be applied to implement fast closed-loop power control. In this case, the received block error rate (BLER) at the BS needs to be evaluated.

Errors that need to be observed are linked to the errors on E-AGCH as following:

$$p_t = p_{E\text{-}AGCH}\left(1 - \frac{\text{card}(ETFCI \text{ set})}{32}\right), \quad (6)$$

where $p_t$ is a target BLER on E-AGCH, $p_{E\text{-}AGCH}$ is a real BLER on E-AGCH and card function chooses the number of elements of the E-TFCI set. The maximum size of the E-TFCI set equals 32. If the MCS signalled on the E-AGCH is set to 32, then any MCS is allowed. In this case there is no way to detect errors on E-AGCH. In reality this is not the case, since in most cases a lower value is chosen for the MCS. For instance, if the MCS is set to a value m (m<32), then errors can be detected in the range of (m+1) to 32. Once the E-TFCI set is known, an average number for errors can be estimated using the error detection method described above and finally an estimation for the errors on E-AGCH can be deduced.

Once this metric is computed, the transmitted power can be adjusted according to the following equations:

$$P_{tx,E\text{-}AGCH}(n) = \qquad (7)$$
$$P_{tx,E\text{-}AGCH}(n-1) \cdot \text{Step}\left(N_{E\text{-}AGCH} + (N_{E\text{-}AGCH} - N) \cdot \frac{p_t}{1-p_t}\right)$$

and $$P_{tx,E\text{-}AGCH}(0) = \Delta \cdot \frac{SIR_{E\text{-}AGCH}}{SIR_{UL} \cdot PG} \cdot UPH \cdot P_{tx,max,UE} \qquad (8)$$

where N is the number of observations on E-AGCH during the period, $N_{E\text{-}AGCH}$ is the number of observed errors on E-AGCH and n is the TTI index. Step is a step function whose value f can be partitioned into a finite number of subintervals on each of which f is a constant. The idea of this power control adjustment method is to set a fixed error probability on E-AGCH and then observe errors on E-AGCH. When an error is detected, the transmission power of the E-AGCH is increased by certain amount and on the other hand if an error is not detected, then the transmission power of the E-AGCH can be reduced by an increment.

Above some embodiments of the invention were described with reference to the figures. It is to be noted that many variations are possible and that the invention is only limited by the appended claims.

The invention equally relates to a corresponding software program product which is arranged to implement the method steps described above when loaded and run on computer means of the system.

The invention equally relates to a corresponding BS 107 which is arranged to implement at least some of the method steps described above.

The invention claimed is:

1. A method of adjusting transmission power on a downlink radio channel from a base station to a user equipment, the method comprises the following steps carried out at said base station:
    receiving an uplink power headroom indication from the user equipment;
    obtaining an estimate of an uplink path loss between the user equipment and the base station, said uplink path loss estimate taking account of said uplink power headroom;
    deriving an estimate of a downlink path loss between the user equipment and the base station, from said uplink path loss estimate;
    detecting errors on the downlink radio channel, wherein the step of detecting errors comprises the base station indicating by sending on the downlink radio channel a first message to the user equipment, the first message comprising an allowed traffic format combination set, the user equipment sending a second message comprising a traffic format combination identifier to the base station, the base station decoding the second message and determining whether the traffic format combination identifier belongs to the allowed traffic format combination set and in case the traffic format combination identifier does not belong to the allowed set, the base station deducing that an error has occurred on the radio channel by decoding information using a modulation coding scheme of the allowed set; and adjusting the transmission power on said downlink radio channel by taking account of said downlink path loss estimate, wherein the step of adjusting the transmission power on the downlink radio channel further takes account of the detected errors.

2. The method according to claim 1, wherein the step of deriving an estimate of a downlink path loss between the user equipment and the base station further comprises determining a corresponding base station transmit power spectral density to user equipment received power spectral density ratio.

3. The method according to claim 1, wherein the downlink radio channel carries scheduling information for a high speed uplink channel from the user equipment to the base station.

4. The method according to claim 1, wherein in case an error has been detected on the downlink radio channel, a cyclic redundancy check is performed on information sent from the user equipment to the base station and in case the cyclic redundancy check shows that the information was not correctly received, an error counter is incremented and in case the error counter exceeds a threshold value, the base station resending information on the downlink radio channel and/or adjusting the transmission power of the downlink radio channel.

5. The method according to claim 1, wherein the format combination set comprises a modulation and coding scheme.

6. A base station having stored thereon a computer program product comprising instructions for implementing the method steps in accordance with claim 1.

* * * * *